United States Patent [19]

Gonzalez

[11] 4,450,060
[45] May 22, 1984

[54] BIPOLAR ELECTROLYTIC CELL

[76] Inventor: Ernesto Gonzalez, c/o Howard, Brawner & Lovett, 131 Dade Savings Bldg., 119 E. Flagler St., Miami, Fla. 33131

[21] Appl. No.: 327,187

[22] Filed: Dec. 3, 1981

Related U.S. Application Data

[62] Division of Ser. No. 207,938, Nov. 18, 1980, Pat. No. 4,332,219.

[51] Int. Cl.³ .................. C25B 9/00; C25B 11/02; C25B 11/10; C25B 1/06
[52] U.S. Cl. .................. 204/268; 204/270; 204/290 F; 204/292; 204/129
[58] Field of Search .................. 204/268–270, 204/290 R, 290 F, DIG. 7, 129, 292

[56] References Cited

U.S. PATENT DOCUMENTS

| | | | |
|---|---|---|---|
| 961,945 | 6/1910 | Finlay | 204/129 X |
| 1,273,050 | 7/1918 | Euler | 204/129 |
| 1,541,947 | 6/1925 | Hartman et al. | 204/269 X |
| 1,544,052 | 6/1925 | Avery | 204/149 |
| 1,600,478 | 9/1926 | Lawaczeck | 204/270 |
| 2,969,315 | 1/1961 | Bacon | 204/284 |
| 3,119,759 | 1/1964 | Hoover | 204/212 |
| 3,310,483 | 3/1967 | Rhodes | 204/268 |
| 3,421,990 | 1/1969 | Penix | 204/290 R X |
| 3,433,729 | 3/1969 | Proskuryakov | 204/278 |
| 3,451,906 | 6/1969 | Weed | 204/269 |
| 3,907,659 | 9/1975 | Paige et al. | 204/290 R X |
| 4,116,805 | 9/1978 | Ichisaka et al. | 204/290 F |
| 4,124,463 | 11/1978 | Blue | 204/129 |
| 4,188,464 | 2/1980 | Adams et al. | 204/290 F X |

*Primary Examiner*—Donald R. Valentine
*Attorney, Agent, or Firm*—Steele, Gould & Fried

[57] ABSTRACT

A reciprocating motor, comprising: a piston/cylinder assembly, having an input/output port; an electrolytic cell for generating a combustible mixture of hydrogen and oxygen gases, the cell being connected to the input-/output port of the piston/cylinder assembly; and, means for igniting the combustible mixture in the cylinder, the piston being first driven outwardly by the force of the exploding gas mixture, and immediately afterward, being pulled back by a vacuum formed when the exploded gas mixture recombines into a trace amount of water, whereby a single charge of the combustible gas mixture achieves a double power stroke. The input/output port is preferably funnel shaped, the larger end being directed into the cylinder, and the smaller end being directed into the electrolytic cell. The electrolytic cell utilizes sets of bipolar electrodes in the form of laminated panels having a wrap-around overlapping border. A free wheeling piston can be utilized to drive a pump. A crank shaft arrangement can be utilized to translate the reciprocating motion into rotary motion. The electrolytic cell is provided with an integral backfire arrestor in the form of mesh material disposed between the electrodes and the outlet of the cell. The trace amounts of water formed by the recombination of the hydrogen and oxygen gases is recycled to the cell through the input/output port.

7 Claims, 11 Drawing Figures

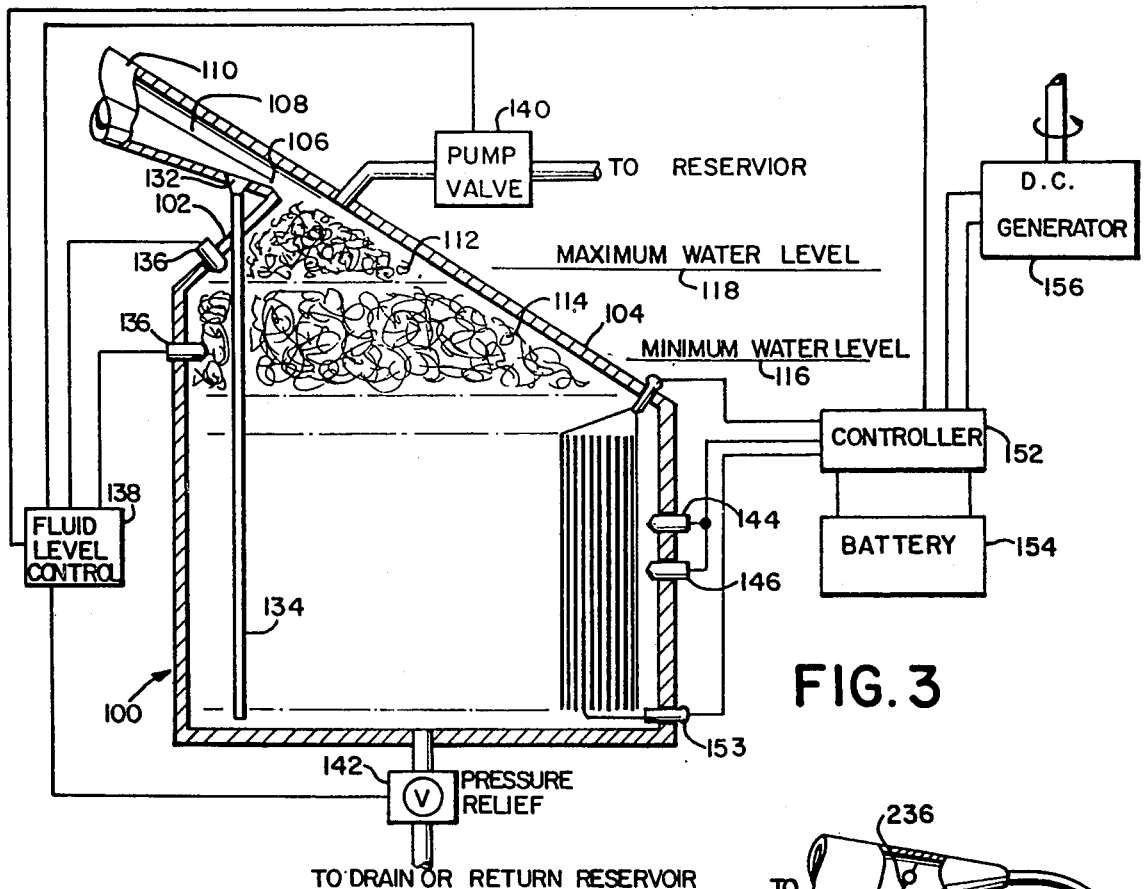
FIG. 3
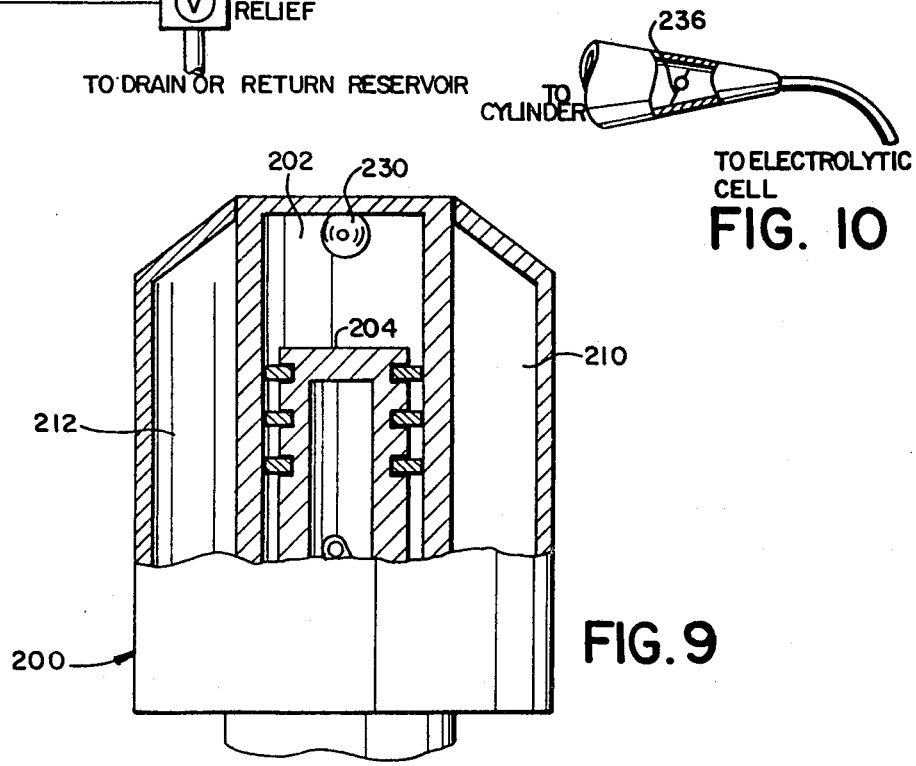
FIG. 10
FIG. 9

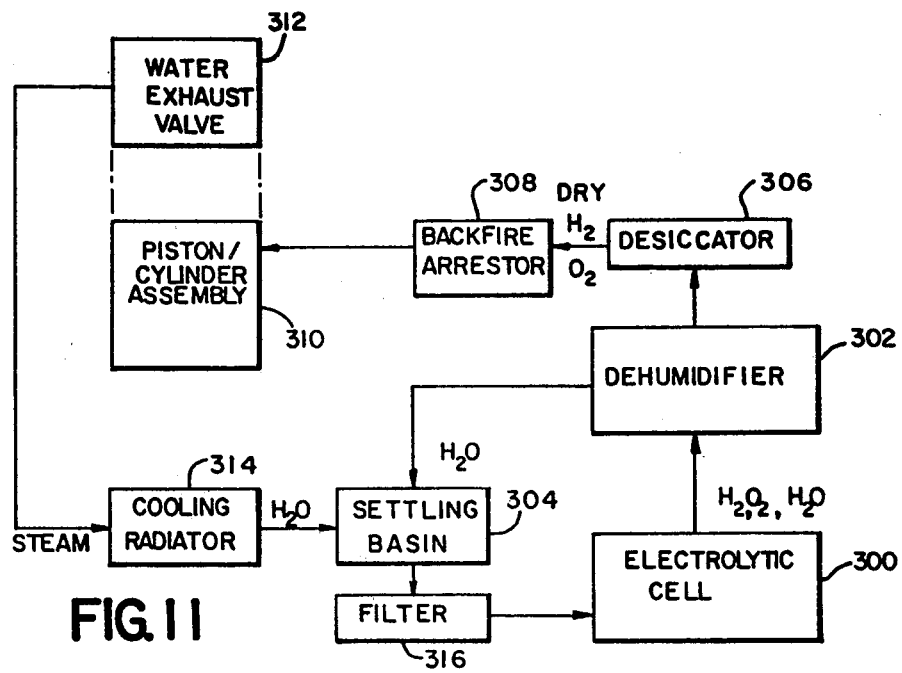
FIG. 11
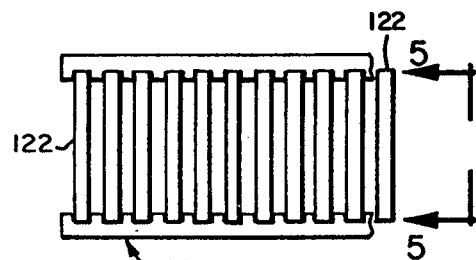
FIG. 4
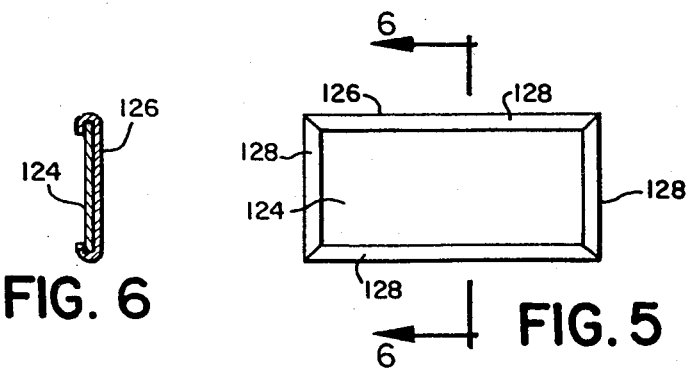
FIG. 6
FIG. 5

BIPOLAR ELECTROLYTIC CELL

This is a division of application Ser. No. 207,938, filed Nov. 18, 1980, now U.S. Pat. No. 4,332,219.

BACKGROUND OF THE INVENTION

1. Field of the Invention

This invention relates to electro-chemical combustion engines, and in particular, to an engine utilizing the recombination of hydrogen and oxygen gases to provide a double power stroke for a piston/cylinder assembly, as a means of using electric power as the prime energizer of an internal combustion piston engine.

2. Prior Art

Many apparatus are known wherein an electrolytic cell is used to generate hydrogen gas, for example, which then forms all or part of the fuel mixture used in an otherwise typical internal combustion engine. In each of these instances, the oxygen gas is not used in the fuel mixture, and it is generally conceded that the use of hydrogen and oxygen gases as a fuel is too dangerous. In modern times, the use of hydrogen and oxygen gases as a fuel seems limited to the field of welding. Two examples of this use are described in U.S. Pat. No. 4,014,777-Brown and U.S. Pat. No. 3,356,600-Henes. In two engine applications, for example, the hydrogen and oxygen mixture is mixed with air from the atmosphere, as in U.S. Pat. No. 3,980,053-Horvath and in another is mixed with the fuel, as in U.S. Pat. No. 4,023,545-Mosher, et al. In each of these instances, the use of hydrogen and oxygen gas alone is not even suggested, and in many instances, is said to be dangerous or impractical. U.S. Pat. Nos. 2,365,330-Carmicahel and 3,311,097-Mittelsteadt disclose the use of hydrogen and oxygen as a fuel, however, the mixture is said to be used with a typical internal combustion engine. Typical internal combustion engines can not operate on the explosion-implosion principle utilized in this invention. U.S. Pat. No. 2,496,623-Fragale discloses a two cycle internal combustion engine which operates on hydrogen and oxygen gas mixture, but the piston is provided with a number of grooves, in order that water formed during the combustion process can run out of the cylinder. Such a configuration would preclude the use of a vacuum to provide the second half of the double power stroke. U.S. Pat. No. 1,905,627-Holland purports to teach the use of hydrogen and oxygen gas, alone, to operate an internal combustion engine. The engine, however, requires two actuated valve assemblies, and makes no mention of the formation of a vacuum or a double power stroke. In fact, it is likely that the Holland apparatus would be rendered inoperable as any vacuum formed would cause both valves to open, more than likely preventing the piston from being pulled back by the vacuum, obviating the double power stroke of this invention.

In summary, there is no known device comparable to the electro-combustion engine taught herein, wherein hydrogen and oxygen gases, alone, and in a stochiometric combustible proportion, are used as the sole energizer for powering a piston in a piston/cylinder assembly, wherein no valves are needed between the source of the hydrogen and oxygen gases and the cylinder, and wherein the piston/cylinder assembly is sufficiently sealed that upon ignition of the gas mixture, the piston is first driven outwardly, and after recombination of the gases into trace amounts of water, the piston is pulled back into the cylinder by the remaining vacuum suction.

SUMMARY OF THE INVENTION

To provide a system which uses electricity as prime energizer to run an internal-combustion engine. It is an object of this invention to provide a non-polluting engine power system.

It is yet another object of this invention to provide an engine power system wherein the combustible mixture is water, which is substantially recycled.

It is yet another object of this invention to utilize a combustible mixture of hydrogen and oxygen gases, an anaero environment, to provide a double power stroke in a piston/cylinder assembly.

It is yet another object of this invention to utilize the vacuum formed after the recombination of hydrogen and oxygen gases to double the power output with respect to the energy required to obtain hydrogen and oxygen from water.

It is yet another object of this invention to provide more efficient means for the production of hydrogen and oxygen gases.

It is yet another object of this invention to provide an improved bipolar electrode for electrolytic processes.

It is still another object of this invention to provide a backfire arrestor so that hydrogen and oxygen gases may be safely used as a sole fuel for electro-combustion engines and other applications.

These and other objects of this invention are accomplished by, in the most basic form, a reciprocating motor, comprising: a piston/cylinder assembly, having an input/output port; an electrolytic cell for generating a combustible mixture of hydrogen and oxygen gases, the cell being connected to the input/output port of the piston/cylinder assembly; and, means for igniting the combustible mixture in the cylinder, the piston being first driven outwardly by the force of the exploding gas mixture, and immediately afterward, being pulled back by a vacuum formed when the exploded gas mixture recombines into a trace amount of water, whereby a single charge of the combustible gas mixture achieves a double power stroke. The input/output port is preferably funnel shaped, the larger end being directed into the cylinder, and the smaller end being directed into the electrolytic cell. The electrolytic cell utilizes sets of bipolar electrodes in the form of laminated panels having a wrap-around overlapping border. A free wheeling piston can be utilized to drive a pump. A crank shaft arrangement can be utilized to translate the reciprocating motion into rotary motion. The electrolytic cell is provided with an integral backfire arrestor in the form of mesh material disposed between the electrodes and the outlet of the cell. The trace amounts of water formed by the recombination of the hydrogen and oxygen gases are recycled to the cell through the input/output port.

Not only does this invention provide more efficient means for electrolizing hydrogen and oxygen gases, this invention doubles the efficiency of any electrolytic cell, by utilizing the vacuum formed as a result of the recombination of hydrogen and oxygen gases to pull a piston back onto a cylinder, thereby effectively doubling the power with respect to the energy required to run the electrolytic cell. Further, problems due to heat and friction can also be minimized, as the piston/cylinder assembly runs essentially cool. That is, notwithstanding the very high temperature of the hydrogen-oxygen explosion, there is virtually no heat build up even when the motor is run continuously. Heat will be mostly friction from the working parts of the engine. The speed of the motor can be controlled electrically, that is by adjusting the voltage applied to the electrode in the electrolytic cell and/or by changing the geometry of the combustion chamber.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 3 is a substantially diagrammatic representation of an electrolytic cell according to this invention;

FIG. 4 is an enlarged side elevation, partially broken away, of any of the sets of electrodes shown in FIG. 3;

FIG. 5 is a view taken along the line 5—5 in FIG. 4;

FIG. 6 is a section view taken along the line 6—6 in FIG. 5;

FIG. 9 is a section view taken along the line 9—9 in FIG. 8;

FIG. 10 illustrates an optional valve assembly which may be disposed between an electrolytic cell and a piston/cylinder assembly; and, FIG. 11 is a block diagram illustrating more fully the operational components of a more sophisticated power system based upon this invention.

DETAILED DESCRIPTION OF THE PREFERRED EMBODIMENTS

Figure 1:
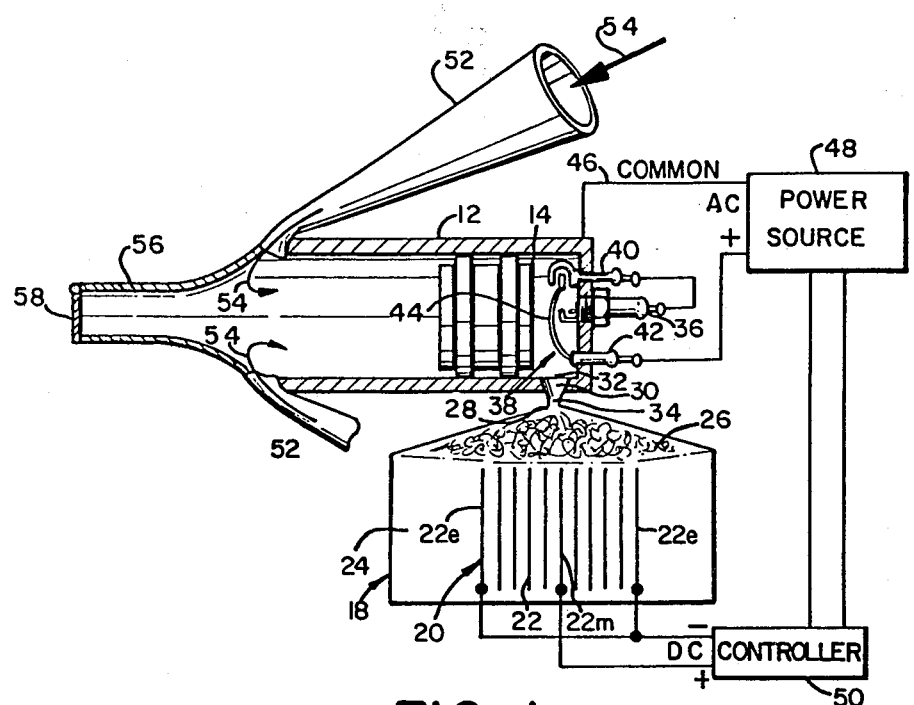
FIG. 1 is a substantially diagrammatic representation of a reciprocating electro-combustion motor according to this invention, as used to power a pump.

This invention, utilized in one of its most elemental forms, is shown in FIG. 1. The entire apparatus 10 is a fluid pump. The fluid pump 10 comprises a cylinder 12 in which a reciprocating piston 14 is slideably disposed. Two sealing rings 16 encircle the piston 14. The piston 14 is essentially free-floating within the cylinder, that is, is not necessarily connected to anything else. Stops formed by protrusions in the inner wall of the cylinder, not shown for purposes of clarification, may be utilized to define the inner and outer limits of movement of the piston within the cylinder.

An electrolytic cell 18 is provided for electrolizing water, in order to form a combustible mixture of hydrogen and oxygen gas. This combination of gases has been termed "HyOx", and will be so referred to hereinafter. The electrolytic cell 18 is provided with at least one set 20 of electrodes, and preferably a plurality of such sets. In the presently preferred embodiment, each set 20 of electrodes comprises eleven individual bipolar electrode plates 22. The middle electrode plate 22m is connected to the positive terminal of a direct current source. The two end plates 22e are connected to the negative terminal of the direct current source or the opposite. The electrolytic solution in the cell is preferably bicarbonate of soda dissolved in water. This solution is safe to touch, even in the highest concentrations, and it is just as effective, if not more effective than other caustic electrolytic solutions which are known and used in other applications and are not to be barred. A backfire arrestor is formed by a metal or plastic mesh mass or otherwise 26, disposed above the electrode plates and below the outlet 28 of the electrolytic cell. Particles of water clinging the mesh material effectively eliminate the hazards of backfire, and at the same time, permit the electrolized HyOx to pass therethrough, into the cylinder. A sufficiently porous sponge material would also be suitable. The electrolytic cell and cylinder are connected by an input/output port 30. The input/output port 30 is preferably funnel shaped, having its larger end 32 directed toward the interior of the cylinder, and its smaller end 34 directed to the electrolytic cell. The HyOx mixture is ignited by spark plug 36. A switch 38 is disposed at the top of the cylinder, mounted therein between two electrically insulated contacts 40 and 42. A bow shaped member 44 has one end thereof flexibly mounted to contact 42. The other end is a contact switch, similar to the points of a distributor which breaks contact with member 40, whenever it is engaged by the piston 14 moving in toward the cylinder, or to the right with respect to the orientation of FIG. 1. Contact 40 is connected to the insulated terminal of the spark plug 36. Contact 42 is connected to the positive terminal of a high voltage alternating current source. The cylinder wall, which is made from metal, is connected by a wire 46 to the common terminals of the alternating current source. A single power source 48 is indicated, which must supply high voltage alternating current to the spark plug 36 and direct low voltage current, through a controller 50, to the electrode plates 22 of the electrolytic cell. The power source 48 may be an alternating current source, having an AC/DC convertor for powering the electrolytic cell, or it may be a direct current source having a DC/AC convertor for powering the spark plug. Such DC/AC convertors are used in the electronic ignition systems of most automobiles produced today, and generally involve the use of a transistor chopping circuit in conjunction with the primary of a transformer. The chopper circuit changes the DC input to a square wave, which is in effect an alternating current, which can then be stepped up by a tesslacoil and used to fire the spark plug. Whenever the piston disengages switch 44, opening the contact thereof, the spark plug is fired. This occurs in each instance when the piston is at its rightmost position, or furthest into the cylinder towards the head.

When a DC current is passed through the electrolytic solution, hydrogen and oxygen gases are liberated from the fluid in the cell, at the surface of the electrode plates. These gases rise to the top of the electrolytic cell, and pass into the cylinder through the input/output port 30. The pressure and volume of gases filling the cylinder is determined by the voltage level at which the electrolytic cell is operated. Certain optimum levels have been discovered, which will be discussed more fully hereinafter. Assuming that the apparatus is in an operational condition, at sometime the piston 14 will be moving to the right, and will engage switch 38. When contact is cut the spark plug 36 fires, and the HyOx, comprising a combustible mixture of hydrogen and oxygen gas, explosively recombines. The force of the explosion of the recombining gases forces the piston out of the cylinder, or toward the left, toward the extreme position shown in FIG. 2. It will be appreciated that the HyOx formed a certain volume of gas within a very small part of the cylinder immediately prior to ignition. When the hydrogen and oxygen gases recombine, they form a trace amount of water, as well as a vacuum, as the volume of the trace amount of water is very significantly smaller than the volume previously occupied by the HyOx in the gaseous state. The effect of this vacuum is multiplied by the fact that the piston has been driven in a direction out of the cylinder, so that the trace amount of water now occupies not only the original volume of the HyOx gases, but a volume which may be five times, ten times or more, larger than the original volume. This very strong vacuum which is created forcefully pulls the piston back into the cylinder, in the direction of the spark plug and switch 38. As the piston is pulled back into the cylinder, further HyOx is also pulled into the cylinder, so that by the time the piston once again engages switch 38, there is a further explosion which drives the piston outwardly, followed by what is in effect an implosion, as the vacuum draws the piston back up. This explosion/implosion effect has been termed "EXPIMP" and will be so referred to hereinafter.

In most engines which utilize hydrogen gas or the combination of hydrogen and oxygen gas for use as a fuel or a fuel additive, the hydrogen and oxygen gas is almost always mixed with air prior to combustion. The combustion of hydrogen and oxygen gas together with air, and perhaps with gasoline, means that a vacuum will not be formed as a result of the combustion process, or in any event, if a vacuum is formed, it will be too weak to have any effect on movement of the piston. The vacuum effect is also apt to be dissipated, if present at all, when the exhaust valve opens in the typical four cycle engine. In such known engines, the piston returns to the firing position within the cylinder as a result of either momentum or the firing of other piston cylinder assemblies in a bank of piston cylinder assemblies. Such mechanisms for returning the piston are not necessary according to this invention, as the piston returns automatically and powerfully. It may be desirable to provide this apparatus with a means for bringing the piston back to a starting position, should it misfire in some fashion or should the vacuum be lost, for example, by improper functioning of the electrolytic cell or missing spark plug.

Figure 2:
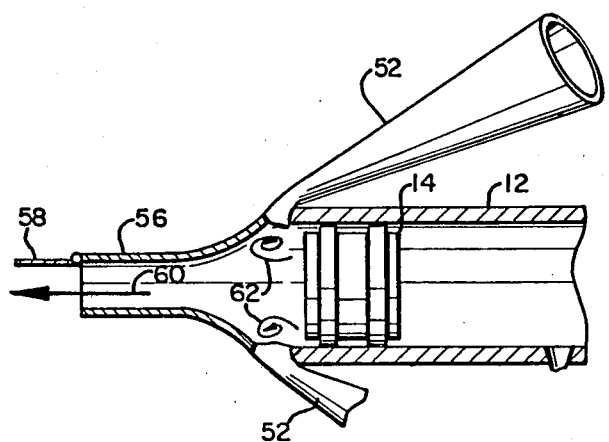
FIG. 2 is a portion of FIG. 1, with the piston in a different operational position.

The reciprocating motion of the piston may be directly utilized in the fluid pump illustrated in FIGS. 1 and 2. During the upstroke of the piston, immediately preceeding the position of the piston as shown in FIG. 1, fluid, such as air or water, may be drawn into one or more funnel-like inlets 52, as shown by arrows 54. The end of the cylinder 12 is connected to a discharge pipe 56, which has a sealing flap valve 58 hingedly mounted at the end thereof. The upstroke of the piston draws the flap valve 58 closed, so that fluid can be drawn into the inlets 52. When the spark plug is ignited, the piston is driven to the position shown in FIG. 2. As it moves in this direction, flap valve 58 is opened so that fluid can leave exit pipe 56, as shown by arrow 60. At the same time, due to the funnel shape of the inlets 52, and a venturi effect, keeps the fluid flowing in through the inlets. Due to vortices or otherwise, illustrated by arrows 62, substantially all of the fluid is forcefully expelled. When the next vacuum is formed, the piston is drawn back into the cylinder, closing flap valve 58 and drawing more fluid in through inlets 52. As the piston reciprocates within the cylinder 14, a steady pulse jet of fluid may be pumped. Such an arrangement is particularly suited for use on underwater jet propulsion systems for a marine vehicle, as the engine runs very cool anyhow, eliminating the need for sophisticated cooling equipment, heat exchangers and the like. It will be appreciated that the trace amounts of water, which may be partially in the form of steam, will eventually become water and find their way back into the translator, flowing through the input/output port 30, where they can be re-dissociated into HyOx. The sealing rings 16 and the inner surface of the cylinder may be made of or coated with low friction plastic material, such as Teflon. The components are not subject to damage from the HyOx explosion, because there is only enough oxygen to burn the hydrogen, as long as care is taken to use compatible materials.

An alternative embodiment of a more sophisticated electrolytic cell for producing HyOx in accordance with this invention is illustrated in FIG. 3. This embodiment contains many safety devices and monitors, which of course would not be necessary in the normal course of operation. As in many instances, they are provided in order to prevent dangerous conditions and emergency situations. The electrolytic cell 100 comprises a number of sets 120 of bipolar electrodes, similar to those diagramatically illustrated in FIG. 1. The number of sets utilized will depend upon the power requirements of the particular HyOx engine and the consequent desired capacity of the electrolytic cell. An enlarged view of a set of electrodes 120 is shown in FIG. 4. In the presently preferred embodiment, eleven such bipolar plates 122 are mounted in each set 120. It is preferable that the plates be spaced as closely together as possible, without of course touching one another. The closer the plates, the less resistance to current flow through the electrolytic solution. As technology permits, separations on the order of molecular diameters, of water for example, are anticipated. Each bipolar electrode comprises a positive and negative plate, one clad around the other. This cladding which also could be sprayed or plated is further illustrated in FIGS. 5 and 6. The inner electrode plate 125 is a simple rectangular sheet. The outer member 126 has its perimeter bent around the edges of the inner plate 124, forming a border or frame 128 therearound. When the electrodes are mounted in rows, the exposed surface of the inner plate always faces the back of the cladding plate of the adjacent electrode. It has been found that this arrangement substantially reduces stray current, and in so doing, reduces the operating temperature of the electrolytic cell and other efficiency-wise benefits. It has been found that increases in the temperature of the electrolytic cell result in progressively inefficient operation and lower production levels of HyOx and much energy is wasted in just heating the water. For this we prefer to have a temperature control switch connected to the heating unit. In one presently preferred embodiment, the outer electrode plate is formed from titanium and the inner plate is formed from stainless steel. Many different combinations of electrode materials may be utilized relating to cathodoanodic relationship with similar results, although the bipolar, clad overlapped edge arrangement is preferred irrespective of the choice of materials.

A further unexpected result of the experiments which resulted in this invention is that lower than expected production rates of gases provide a higher return with respect to the relative cost of energy input than larger outputs. Some of this is of course due to heating which takes place at higher current and voltage levels, which heating impedes the electrolytic process. The following chart indicates experimental results of a typical yet inefficient cell. The chart indicates the current drawn by the electrolytic cell (Amps), the voltage across each set of electrode plates (Volts), the product of the amps and volts, indicating the power consumption (Watts Used) and the assigned BTU-WATT value of the hydrogen involved in accordance with the Handbook of Chemistry and Physics.

| Amps | Volts | Watts Used | Watts Produced |
|------|-------|------------|----------------|
| 0.1  | 1.5   | .15        | .3             |
| 0.2  | 1.6   | .32        | .6             |
| 0.3  | 1.7   | .51        | .9             |
| 0.4  | 1.8   | .72        | 1.2            |
| 0.5  | 1.95  | .975       | 1.5            |
| 1.0  | 2.0   | 2.0        | 3.0            |
| 2.0  | 2.5   | 5.0        | 6.0            |
| 3.0  | 2.85  | 8.55       | 9.0            |
| 4.0  | 3.05  | 12.2       | 12.0 (BEP)     |
| 5.0  | 3.15  | 15.75      | 15.0           |
| 6.0  | 3.4   | 20.4       | 18.0           |
| 7.0  | 3.35  | 24.4       | 21.0           |
| 8.0  | 4.0   | 32.0       | 24.0           |
| 9.0  | 4.1   | 36.9       | 27.0           |
| 10.0 | 4.4   | 44.4       | 30.4           |

As can be seen from the chart, the break even point, market "BEP" is approximately 0.4 amps and 3.05 volts in, using 12.2 watts for the input and getting 12 Watts-BTU output. Subsequent cells have proved much more efficient at all input levels, but the BEP remains substantially the same. For all voltage and amperage levels below the break even point, the Watts-BTU produced exceeds the watts used. This result is even further amplified because the "EXPIMP" principle supplies power to the piston when it is expelled and supplies power to the piston when it is drawn back, thereby doubling the work accomplished by a single charge of HyOx. It has been found that an adequate supply of HyOx can be provided by an electrolytic cell having a volume approximately twice that of the displacement of the piston within the cylinder. In a multi-piston engine it would likely be more economical to have a small electrolytic cell for each cylinder, rather than a single large electrolytic cell, however individual applications may require some compromise between the two extremes.

Figure 7:
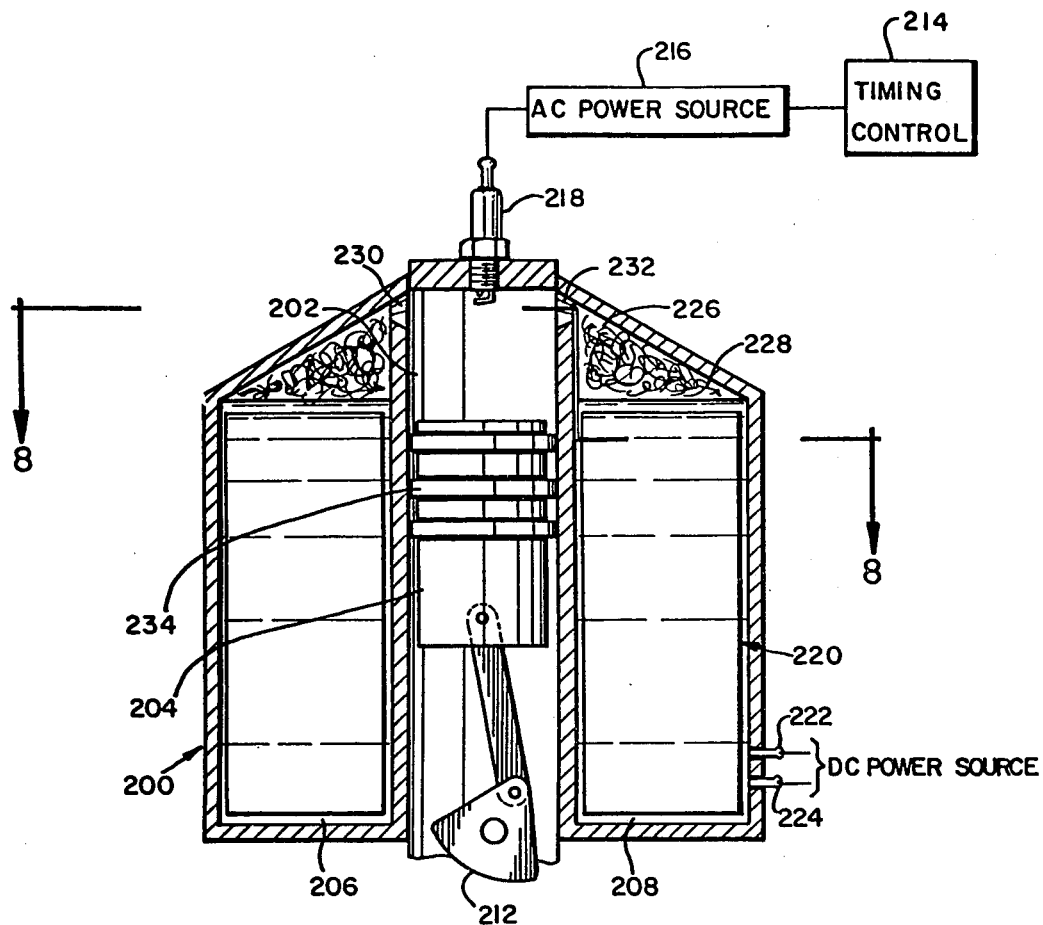
FIG. 7 is an electro-combustion engine according to this invention wherein the reciprocating motion of the piston is translated into rotary motion.

Referring once again to FIG. 3, the electrolytic cell has angled or dome shaped top walls 102 and 104, which direct HyOx gas to the inlet portion 106 of an input/output port 108, whose larger end 110 is connected to, for example, a piston/cylinder assembly such as that shown in FIG. 1 or that shown in FIG. 7. The top portion of electrolytic cell is packed with mesh filler material. The uppermost portion is closely packed with a metallic wool mesh 112 of fine gauge. The section between the fine metal mesh 112 and the tops of the electrode plates is less densely packed with a heavier gauge metallic or plastic mesh 114. The minimum water level 116 corresponds to a level within the more open mesh 114, and the maximum water level 118 corresponds to a level slightly above the bottom of the fine mesh 112. What happens is that during the course of electrocumbustion the trace amounts of water formed in cylinders as steam in translator will eventually condense in part, and will roll down input/output port 108, being for the most part trapped in the opening 132 of drain pipe 134, so that recycling of the water at each explosion will not interfere significantly with the out flow of HyOx. In order to maintain the water level between the desired minimum and maximum levels, sensors 136 are mounted through the walls of the electrolytic cell. A fluid level control automatically regulates the input of electrolytic solution through pump valve 140, and permits electrolytic solution to be discharged through pressure relief valve 142. Pressure relief valve 142 may also be adjusted to operate independently, in the event pressure within the electrolytic cell exceeds safe levels. The temperature and pressure in the cell may be monitored by sensors 144 and 146 respectively. Terminals 148 and 150 are also provided, for powering the electrode plates. A controller 152 is used to monitor and control the current and voltage levels so as to provide the desired output of HyOx and thereby control engine speed, output or power. The apparatus is powered by a battery or a bank of batteries 154, and in a reciprocating engine configuration, may also be provided with a direct current generator 156 which can be used to recharge the battery. The average maximum pressure within the electrolytic cell needed to provide proper operation is approximately 15 pounds per square inch.

Figure 8:
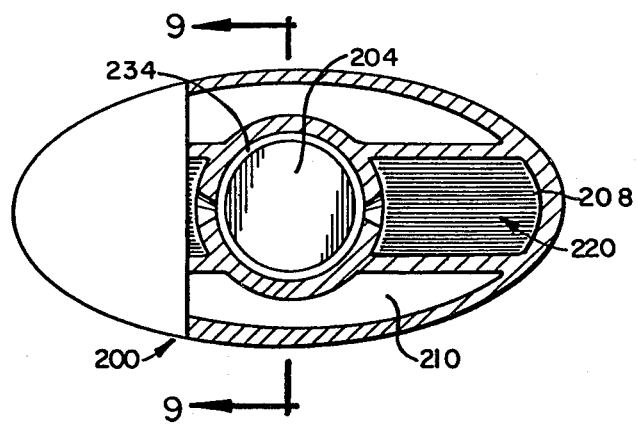
FIG. 8 is a section view taken along the line 8—8 in FIG. 7.

The application of the principles of this invention as applied to a reciprocating internal combustion engine are illustrated in FIGS. 7, 8 and 9. An engine 200 comprises a cylinder 202, a piston 204 and one or more electrolytic cells 206 and 208. The engine, which can be so constructed as to have a unitary appearance is also provided with electrolytic fluid reservoirs 210. In this instance, the piston is connected to a crank shaft assembly 212, so that the reciprocating motion of the piston is translated to rotary motion. Inasmuch as such an arrangement may be used in a multi-cylinder arrangement, a timing control 214 is used in conjunction with controlling the AC power source 216 utilized to fire spark plug 218. Sets 220 of bipolar electrode plates, as described hereinbefore, are disposed within the electrolytic cells, in order to produce HyOx. The electrolytic cells are powered through terminals 222 and 224. Mesh materials 226 and 228, corresponding to the mesh material 112 and 114 described in connection with FIG. 3 are disposed at the top of the electrolytic cell, providing a flashback arrestor capability. Input/output ports 230 and 232 connect each electrolytic cell with the cylinder. As in the other embodiment described in connection with FIGS. 1 and 2, the piston is provided with sealing rings 234. THe operation of this engine is identical to the fluid pumping engine. HyOx enters the cylinder when the piston is at the top of its upstroke, and upon ignition by the spark plug explodes, forcing the piston downwardly, or out of the cylinder. After the piston has travelled sufficiently far to rotate the cam shaft more than 180°, the resulting vacuum pulls the piston back up into the cylinder, completing one revolution of rotary motion with two power strokes. As the piston moves back up the cylinder, more HyOx is pulled and pumped therein helped by the pressure at translator and after the piston passes top dead center, a further ignition drives the piston back downwardly, repeating the cycle. This operation is possible without opening and closing valves in connection with ports 230 and 232, as operation can be controlled by adjusting the voltage across the electrode plates. However, if desired, further control can be provided by flap or other valve as illustrated in FIG. 10. In a simple one cylinder engine it would also be possible to use a self-firing mechanism such as that described in connection with the fluid pump of FIGS. 1 and 2. The various safety and control members described in connection with FIG. 3 have been eliminated from this embodiment for purposes of clarification, however they may also be included as well. Further, in such an arrangement, the electrolytic cell need not be built integrally with or mounted adjacent to the piston/cylinder assembly, although this is a convenient arrangement as it saves space. It must be remembered that if a modified engine according to this invention is used in place of a conventional internal combustion engine, the elimination of the carburetor, air filter, exhaust manifold, intake manifold, catalytic converter and most of the cooling system, just to name a few, will result in considerable savings in weight and space, notwithstanding the necessity to provide one or more batteries.

A more sophisticated system for use in an engine which might replace a conventional internal combustion engine, having a plurality of cylinders, is illustrated in block diagram form in FIG. 11. An electrolytic cell 300 produces hydrogen gas, oxygen gas and some amount of water therewith. This mixture is passed through dehumidifier 302, which removes much of the liquid water, allowing it to run into a settling basin 304. The dehumidified HyOx is then passed through a dessicator 306, to further dry it. From the dessicator, the dry HyOx passes through a backfire arrestor 308, either similar to those described herein, or similar to those now available. The dried HyOx then passes into one of the piston cylinder assemblies, where it is ignited. The explosion drives the piston downwardly, and the resulting vacuum pulls the piston back up. Over a long period of time, there may be an accumulation of liquid water in the cylinder, as it can not simply pass back through the two-way input/output port of the previously described embodiments. Accordingly, a water exhaust valve 312 is provided through which steam can escape, and be directed into a cooling radiator 314. The cooled water is then directed into the settling basin 304, passed through cleansing filter 316, and finally directed back into the electrolytic cell to be recycled and re-electrolized. A timing means for igniting the HyOx charge in each cylinder, perhaps in the form of a modified distributor, can also be provided.

The various applications to which the "EXPIMP" principle may be applied are too numerous to list and describe in detail. However, these include for example the use of HyOx as an explosive, which causes a minimum of damage due to the vacuum following every explosion. This is particularly advantageous in mining and under water demolition. Inasmuch as reciprocating motion of a piston/cylinder assembly can be used either directly as illustrated in the water pump, or indirectly as illustrated in the engine shown in FIGS. 7, 8 and 9, HyOx powered engines operating on the "EXPIMP" principle, can be used for almost any application, with the knowledge that they can be operated safely, and will under all conditions, operate without any pollutant exhaust whatsoever. This invention also provides an improved lectrolytic cell, so that HyOx can be more easily utilized in known applications, such as welding, and the like.

The present invention may be embodied in other specific forms without departing from the spirit or essential attributes thereof, and accordingly, reference should be made to the appended Claims, rather than to the foregoing Specification as indicating the scope of the invention.

We claim:

1. An electrolytic cell for separating hydrogen and oxygen gases from water, comprising:
   a sealed container, having a vent for withdrawing the hydrogen and oxygen gases;
   a charge of water disposed in the container;
   a charge of bicarbonate of soda dissolved in the water, forming an electrolytic solution;
   at least one set of a plurality of bipolar electrodes spaced from one another but otherwise, disposed in a closely packed row and substantially immersed in the electrolytic solution, each of the bipolar electrodes being a lamination of a flat inner member formed from a sheet of a first metal and a flat outer member formed from a sheet of a second metal, the peripheral edges of the outer member being folded around the peripheral edges of the inner member;
   means for holding the plurality of bipolar electrodes in the closely packed row; and,
   means for connecting the terminals of a direct current electrical source to the set of electrodes, whereby upon application of the direct current, hydrogen and oxygen gases are generated in stoichiometric proportion.

2. The electrolytic cell of claim 1, wherein one direct current source terminal is connected to both endmost of the row of bipolar electrodes and another terminal of the direct current source is connected to a bipolar electrode disposed substantially in the middle of the row.

3. The electrolytic cell of claim 1, comprising a plurality of sets of rows of the bipolar electrodes, each of the sets being connected in parallel with respect to the direct current source.

4. The electrolytic cell of claim 2, comprising a plurality of sets of rows of the bipolar electrodes, each of the sets being connected in parallel with respect to the direct current source.

5. The electrolytic cell of claim 1, wherein the inner electrode of the bipolar electrodes is formed from titanium and the outer electrode of the bipolar electrodes is formed from stainless steel.

6. The electrolytic cell of claim 1, wherein the inner and outer electrodes of the bipolar electrodes are spaced apart from one another by small, thin insulating members.

7. The electrolytic cell of claim 1, wherein the bipolar electrodes are imperforate.

* * * * *